United States Patent [19]

Meyer

[11] 4,437,055
[45] Mar. 13, 1984

[54] PROCESS FOR THE CAPACITIVE MEASUREMENT OF LENGTHS AND OF ANGLES

[76] Inventor: Hans U. Meyer, rue des Taneurs 3, 1110 Morges, Switzerland

[21] Appl. No.: 323,478

[22] Filed: Nov. 20, 1981

[30] Foreign Application Priority Data

Nov. 21, 1980 [CH] Switzerland .................. 8609/80

[51] Int. Cl.³ ........................................... G01R 27/26
[52] U.S. Cl. ............................... 324/61 R; 324/61 P; 324/61 QS
[58] Field of Search ................ 324/61 R, 61 P, 61 QS

[56] References Cited

U.S. PATENT DOCUMENTS

| 3,297,941 | 1/1967 | Wolfendale | 324/61 QS |
| 3,491,292 | 1/1970 | Evans | 324/61 R |
| 3,523,246 | 8/1970 | Hall et al. | 324/61 R |
| 3,857,092 | 12/1974 | Meyer | 324/61 R |
| 3,959,723 | 5/1976 | Wagner | 324/61 QS X |
| 4,296,371 | 10/1981 | Keizer et al. | 324/61 R |

Primary Examiner—Stanley T. Krawczewicz
Attorney, Agent, or Firm—Emory L. Groff, Jr.

[57] ABSTRACT

Several electrodes (20) are movable respective to several groups of electrodes (11 to 18). The latter receive, from modulating devices (28) modulation voltages which induce a voltage into the electrodes (20). The induced voltage is amplified in (21) and demodulated by a synchronous demodulating device (22) guided by an oscillator (23). The comparator (24) controls a binary counting device (25) the state of which constitutes a direct measurement of the relative position of the electrodes. The low-level outputs of counting device (25) govern a digital-analogical transformer (26) which delivers a modulation voltage to a function generator (27).

8 Claims, 8 Drawing Figures

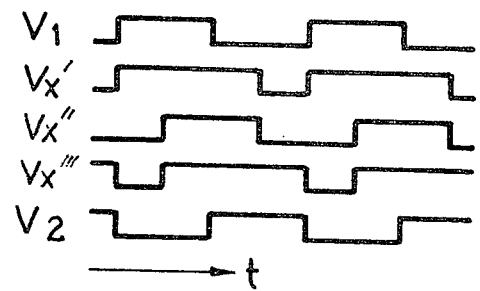
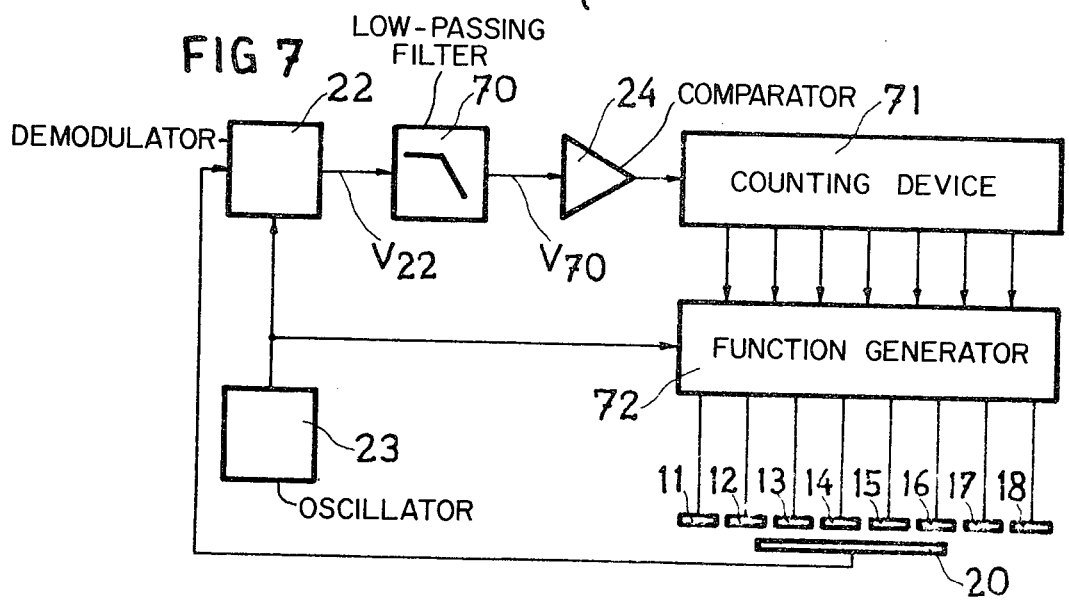
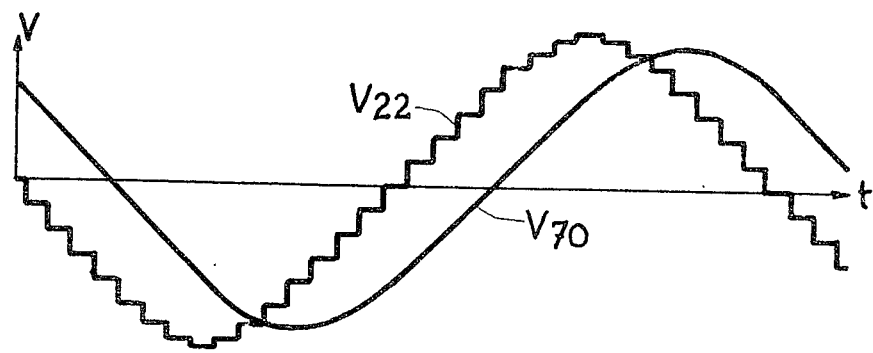

PROCESS FOR THE CAPACITIVE MEASUREMENT OF LENGTHS AND OF ANGLES

The present invention relates to a process for the capacitive measurement of lengths and of angles. In Swiss Pat. No. 539,837, there is disclosed a process in which the determination of the mutual displacement of capacitive elements is obtained by breaking up the displacement trajectory into successive individual capacitive elements, the passages of which are detected one after the other. It is thus possible to obtain, on the displacement trajectory of an individual element, exact linear displacement voltages. One drawback of that device, however, resides in the fact that it is difficult to regulate the measuring process in a manner such that, when the individual measuring elements are placed in series, corresponding to their voltages, there will occur no discontinuous errors which might be the result of accidental defects in the distribution of the electrodes.

The present invention has as its object to eliminate those drawbacks, by eliminating in a simple manner the errors of transfer from one interpolation element to the other, while preserving the linear interpolation properties. The invention comprises a capacitive process for the measurement of lengths and of angles using emitting electrodes mounted in series and at least one electrode which is a receiver electrode facing the emitting electrodes and which can be displaced in a position parallel to the latter.

The aforementioned process is characterized in that the emitting electrodes which are facing a receiving electrode form two groups each one connected to a volatage $V_1$ and respectively $V_2$ having a constant amplitude, a same frequency and an opposite phase, separated by an emitting electrode which is under an alternating voltage $V_x$ varying between $V_1$ and $V_2$ in a manner such that it constitutes a displacement measurement when the signal which is caught by the receiving electrode becomes equal to zero. The capacities of the aforementioned groups which are facing the receiving electrode are on a trajectory of at least one shifting distance between two emitting electrodes, a linear function of the displacement.

The advantage of those arrangements resides in the fact that at the transition points between two neighboring interpolation intervals, voltage $V_x$ is identical, depending on the direction of displacement, to voltages $V_1$ or $V_2$, so that, while preserving the high linear interpolation character, as will be explained below, there exists the assurance of having problem free transitions between neighboring interpolation intervals.

Examples of execution of the capacitive process for the measurement of lengths, according to the present invention, are described with reference to the attached drawing, in which:

FIG. 6 illustrates a mode which makes it possible to bring, by dephasings which are not very marked, the waveshaped voltage $V_x$ from $V_1$ to $V_2$;

FIG. 7 is an example of an electronic diagram for which the moment of the passage through zero constitutes a measurement of the displacement; and FIG. 8 represents the shape of the demodulated receiving signal, in an electronic diagram according to FIG. 7.

Figure 1:
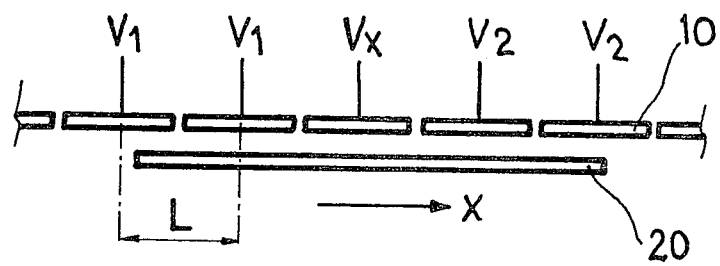
FIG. 1 illustrates a general principle arrangement of the electrodes.

As may be seen in FIG. 1, emitting electrodes 10 placed so as to face a single receiving electrode 20, are connected to three alternating voltages, an individual emitting electrode, usually the one located close to the middle, being connected to an alternating voltage $V_x$, while the electrodes located on one of the sides are connected to an alternating voltage $V_1$ of constant amplitude, and those located on the other side are connected to an alternating voltage $V_2$, voltages $V_1$ and $V_2$ presenting the same frequency, but being in phase opposition. $V_x$ is variable in amplitude for example. If there is given as a condition that the sum of the alternating currents at the receiving electrode must be equal to zero, it may be seen that for a relative displacement X of the receiving electrode, relative the emitting electrodes, voltage $V_x$ varies in a linear manner with the displacement of X, and that at the point of the displacement which exactly corresponds to the average interval L of the electrodes, that voltage passes through zero, because a change of phase occurs from $V_1$ to $V_2$. The marginal conditions of the interpolation interval, thus, are exactly defined: they are met when the alternating voltage caused on the receiving electrode becomes null for $V_x=V_1$, and respectively for $V_x=V_2$. When that is the case, the distribution of the emitting electrodes is displaced by one electrode, through electronic means. When there are several receiving electrodes, and if N emitting electrodes come to place themsleves at mid-distance between those receiving electrodes, the distribution of the emitting electrodes over N steps will be a periodic function of the position.

Figure 2:
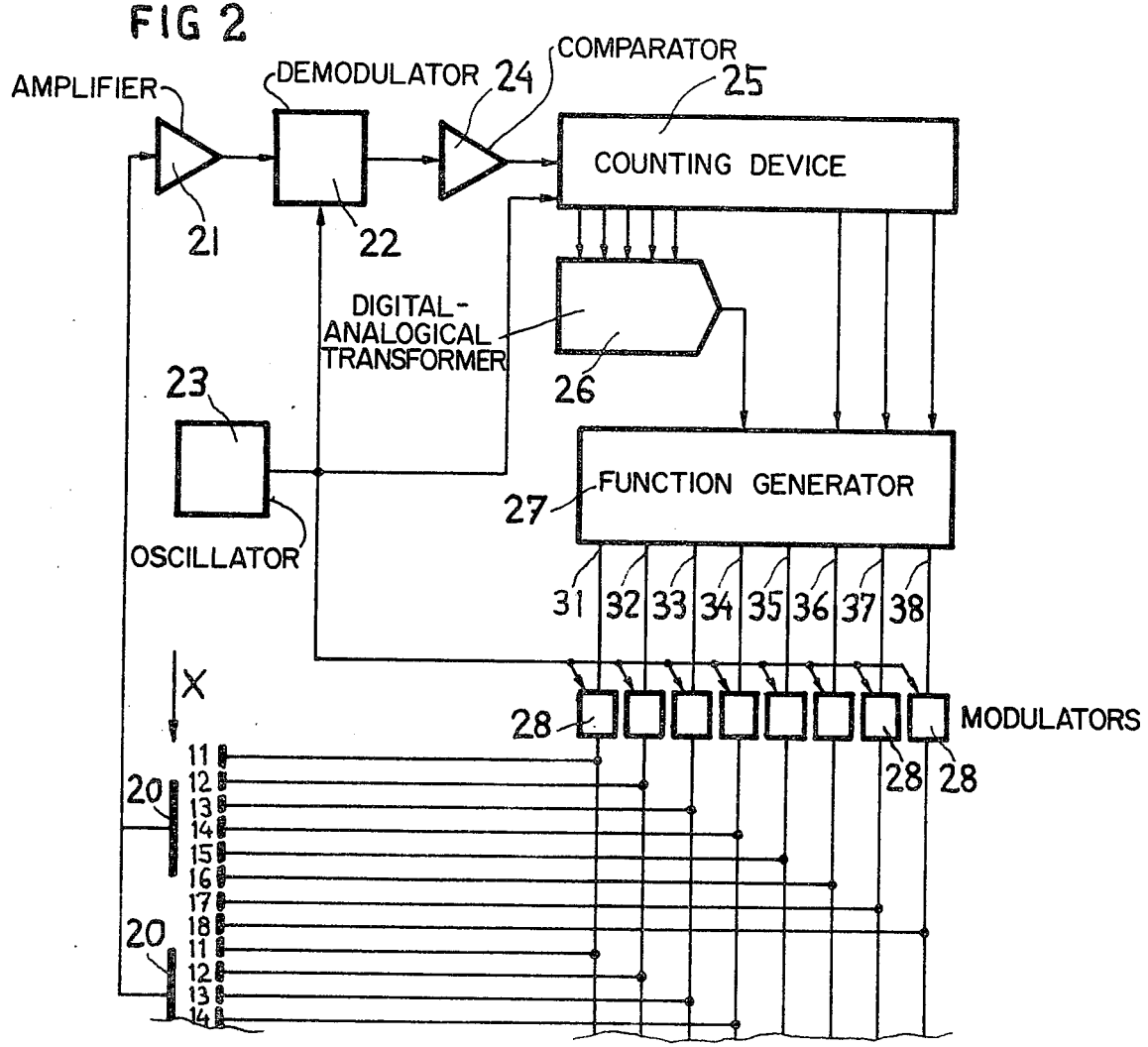
FIG. 2 is a diagram of an associated electronic wiring.

FIG. 2 shows the general diagram of an electronic circuit which may be used to that end. The signal received coming from receiving electrode 20 is amplified by amplifier 21 and brought under low impedance to a synchronous demodulator 22 piloted by an oscillator 23. The signal is then brought to a digital level in a comparator 24 which for its part governs the counting and the down-counting input of a binary counting device 25. The counting input of counting device 25 is connected, in order to simplify the representation, also to oscillator 23. The state of counting device 25 is a direct measurement of the relative position of the electrodes, as it may be seen from the following explanations. The low value outputs of the counting device 25 govern a digital-analogical transformer 26 which supplies the modulation voltage for the amplitude variation which occurs in a linear manner as a function of the displacement. That modulation voltage, as well as the high values output of the counting device, lead to a function generator 27 which has N outputs (in the present case, 8 outputs) 31 to 38.

Figure 3:
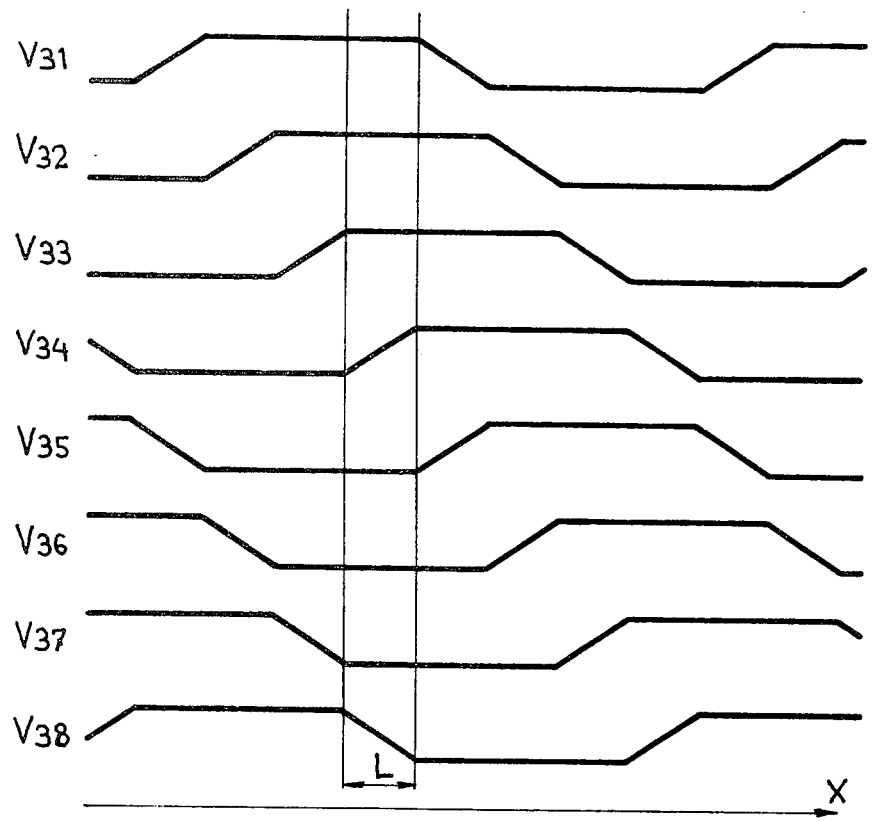
FIG. 3 represents the voltage amplitude variations in the diagram according to FIG. 2, as a function of the displacement X.

FIG. 3 shows the output wave shapes, produced by the function generator 27, as a function of the position of the counting device as a result of the displacement. Each one of those outputs is brought to groups of electrodes, through a modulator 28 connected to oscillator 23.

Figure 4:
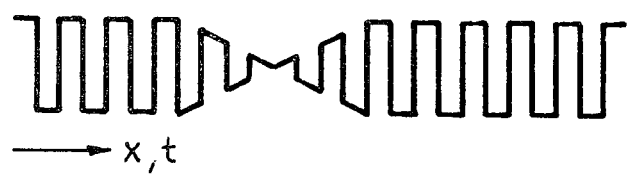
FIG. 4 represents the voltage which exists at one electrode of the diagram according to FIG. 2, for a displacement at constant speed as a function of time.

There has been shown in FIG. 4 the wave shape obtained on one electrode, considering a constant speed displacement. There is seen, in FIG. 3, that for a given displacement L, for two of the eight electrodes, the modulation voltage varies constantly (electrode 14 and 18). Electrode 14 is located facing one receiving electrode, while the other one 18 is located between two receiving electrodes. Electrode 18 thus exerts no influence on the receiving electrodes, so that only electrode 14 is connected to $V_x$, relative to a receiving electrode. FIG. 3 further shows that the linear characteristics of neighboring electrodes exactly follow one another so that the measurement is a linear one over the entire field of displacement, and that the state of the counter thus reproduces a linear measurement of the displacement.

Figure 5:
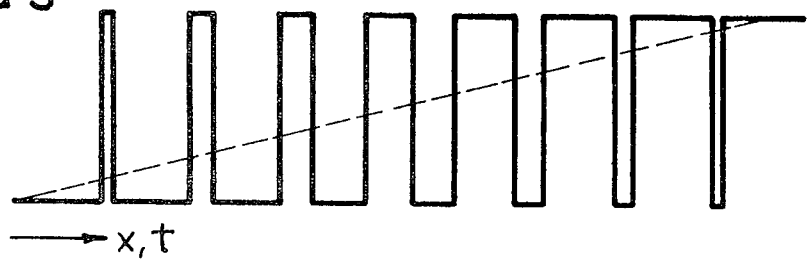
FIG. 5 illustrates another possibility of modulation of voltage $V_x$ for the production of a linear interpolation.

So that it might be possible to easily integrate all of the electronics, it is desirable to reduce to a minimum the linear functions, especially the digital-analogical transformer. That is the case, for example, if instead of causing variations of amplitude in a linear manner with the displacement through a variable impulse ratio, which ratio varies in a linear manner with the displacement $V_x$ is alternately made equal to $V_1$ and to $V_2$. FIG. 5 illustrates the corresponding modulation function, for a constant speed displacement. Fitted with a low-passing filter, that device is the equivalent of a linear amplitude modulation.

FIG. 6 shows another mode of production of a linear transition. In that case, the signal is modified in manner such as to obtain a linear transition after demodulation (synchronous demodulation) and by filtering through a low-passing filter. In the example illustrated in FIG. 6, $V'_x$ is equivalent to $+0.5\ V_1$, $V''_x$ is equivalent to zero and $V'''_x$ is equivalent to $-0.5\ V_1$, consequently it is equivalent to $+0.5\ V_2$. In that case, there no longer is a constant transition but a number of intermediary values distributed in a linear manner but which give a linear gradation of the signal which can be filtered without any difficulty, so that there again is obtained a linear characteristic.

A suitable circuit is represented in FIG. 7. There is used here, instead of a counting-down counting device which always follows the displacement, an adding counting device 71 which counts in a continuous manner, that is to say the distribution of the emitting electrodes follows a fictitious displacement of the receiving electrodes at a speed which is proportional to the frequency of the counting device. The function generator 72 supplies rectangular waves $V_1$ and $V_2$ which correspond to the state of the counting device, and the transition waves $V_x$, as represented in FIG. 6 and takes them following a correct sequence to the different electrodes 11 to 18.

FIG. 8 shows the demodultated signal $V_{22}$ which still presents a residual wave resulting from the discrete graduations of the transition wave shape of $V_x$. After the low-passing filter 70, the voltage $V_{70}$ however varies in a linear manner in the zone of passage to zero, so that there is obtained here also, a linear relationship between the time of the passage to zero, that is to say the state of the counting device at that time and the displacement X.

I claim:

1. A capacitive process for the measurement of lengths and of angles, which uses a plurality of emitting electrodes (10) arranged in series, and at least one receiving electrode (20) which faces the emitting electrodes and is of less length than said series, and which is displaceable parallel to the latter, characterized in that the emitting electrodes which face a receiving electrode form two groups each one of them connected to an alternating voltage $V_1$, respectively $V_2$, of constant amplitude, having the same frequency and of opposite phase, separated by an emitting electrode which is connected to an alternating voltage Vx which is varied between $V_1$ and $V_2$ in a manner such that it constitutes a measurement of the displacement of the receiving electrode, the signal caught by the receiving electrode being maintained equal to zero by varying said voltage Vx, the capacities between the aforementioned emitting and receiving electrodes being, over a trajectory of at least one L, which is the shift between the center lines of two emitting electrodes, an exact linear function of the displacement.

2. A process according to claim 1, characterized in that the amplitude of $V_x$ changes, in a manner which corresponds to the displacement, from the amplitude of $V_1$ to the amplitude of $V_2$ passing through zero.

3. A process according to claim 1, characterized in that the alternating voltages $V_1$ and $V_2$ are complementary rectangular voltages, and in that $V_x$ also is a rectangular voltage which progressively passes, or by discreet changes passes from $V_1$ to $V_2$.

4. A process according to claim 1, characterized in that the alternating voltages $V_1$ and $V_2$ are complementary rectangular voltages, and that $V_x$ also is a rectangular voltage which progressively or in small increases passes from $V_1$ to $V_2$.

5. A process according to claim 1, characterized in that the distribution of the emitting electrodes is displaced by one electrode, when the alternating voltage $V_x$ is identical with the alternating voltage $V_1$, alternately $V_2$.

6. A process according to claim 4, characterized in that the distribution of the emitting electrodes and $V_x$ are modified continuously in a manner such that they correspond to a fictitious displacement with a constant speed, the time of the passage at zero of the alternating voltage on the receiving electrode thus becoming a measurement of the displacement.

7. A device for the execution of the process according to claim 5, characterized in that the passage at zero of the alternating voltage is determined by a synchronous detecting device (22) equipped with a comparator (24) assembled following it.

8. A device according to claim 6, characterized in that $V_x$ assumes only discreet intermediary values, and in that the higher frequency wave resulting from it is filtered through a low-passing filter (70) mounted between the synchronous detecting device (22) and the comparing device.

* * * * *